(12) United States Patent
Koerner et al.

(10) Patent No.: US 8,500,376 B2
(45) Date of Patent: Aug. 6, 2013

(54) CUTTING INSERT

(75) Inventors: Lothar Koerner, Bochum (DE);
Carsten Schwaner, Muelheim a. D. Ruhr (DE); Uwe Hahn, Oberhausen (DE)

(73) Assignee: Kennametal Inc., Latrobe, PA (US)

( * ) Notice: Subject to any disclaimer, the term of this patent is extended or adjusted under 35 U.S.C. 154(b) by 678 days.

(21) Appl. No.: 12/519,224

(22) PCT Filed: Aug. 21, 2007

(86) PCT No.: PCT/DE2007/001480
§ 371 (c)(1),
(2), (4) Date: Jun. 15, 2009

(87) PCT Pub. No.: WO2008/074278
PCT Pub. Date: Jun. 26, 2008

(65) Prior Publication Data
US 2010/0061816 A1    Mar. 11, 2010

(30) Foreign Application Priority Data
Dec. 16, 2006 (DE) .................... 20 2006 018 992 U

(51) Int. Cl.
*B23B 27/14* (2006.01)
*B23C 5/20* (2006.01)

(52) U.S. Cl.
USPC .......................................... 407/113; 407/114

(58) Field of Classification Search
USPC ..................... 407/113, 114, 115, 116, 107
See application file for complete search history.

(56) References Cited

U.S. PATENT DOCUMENTS

| 4,880,338 | A | * | 11/1989 | Stashko ................... | 407/114 |
|---|---|---|---|---|---|
| 5,630,681 | A | * | 5/1997 | Paya ...................... | 407/114 |
| 5,758,994 | A | | 6/1998 | Hintze et al. ............ | 407/116 |
| 5,921,722 | A | | 7/1999 | Paya et al. ............... | 407/114 |
| D424,074 | S | * | 5/2000 | Nelson .................... | D15/139 |
| D426,245 | S | * | 6/2000 | Bernadic et al. ......... | D15/139 |
| D487,757 | S | * | 3/2004 | Kasperik et al. ......... | D15/139 |
| 6,932,545 | B2 | * | 8/2005 | Vanberg ................... | 407/114 |
| 7,278,805 | B2 | * | 10/2007 | Ley ......................... | 407/114 |

FOREIGN PATENT DOCUMENTS

| JP | 54172389 | 12/1979 |
|---|---|---|
| JP | 10500909 | 1/1998 |
| JP | 11156606 | 6/1999 |

* cited by examiner

Primary Examiner — Will Fridie, Jr.
(74) Attorney, Agent, or Firm — Larry R. Meenan, Esq.

(57) ABSTRACT

The invention relates to a cutting insert for chip-forming machining, of which at least the top surface, on one side, forms the face (1) and the peripheral, planar side surface, which are located at right angles to one another, form the flanks (2), wherein, downstream of a planar face portion (3) which is adjacent to the flanks and is arranged at a rake angle of 0°, the face terminates, via downwardly sloping planar wall portions (4), in a lower-level, planar chip-forming base (5) and, in the direction of the centre, it slopes up, via upwardly sloping planar wall portions (6), to a central, planar face plateau (7). In order to ensure specific chip formation over the entire region of the cutting insert, it is proposed that a plurality of raised chip-forming elements (8) are arranged parallel to one another, and at equal spacings, on two mutually opposite, upwardly sloping wall portions (6) of the face plateau (7), and these chip-forming elements have a roof surface (9), which slopes down to the chip-forming base (5), and downwardly sloping flanks (10).

11 Claims, 3 Drawing Sheets

CUTTING INSERT

CROSS REFERENCE TO RELATED APPLICATIONS

This application is the US national phase of PCT application PCT/DE2007/001480, filed 21 Aug. 2007, published 26 Jun. 2008 as WO2008/074278, and claiming the priority of German patent application 202006018992.0 itself filed 16 Dec. 2006, whose entire disclosures are herewith incorporated by reference.

The invention relates to a cutting insert for chip-forming machining, of which at least the top surface, on one side, constitutes the face and the full-perimeter, planar side surfaces, which are located at right angles to one another, constitute the flanks, wherein, after a planar face portion that is adjacent to the flanks and is arranged at a rake angle of 0°, the face tapers, via downwardly sloping planar wall portions, into a lower-level, planar chip-forming base and, in the direction of the center, it slopes up, via upwardly sloping planar wall portions, to a centrally located, planar face plateau.

Owing to its cutting edge geometry, such a cutting insert is particularly suitable for heavy-duty chip-removing machining, i.e. for large cut depths and high feeds. The planar face portion initially adjoining the flanks at a rake angle of 0° over a certain distance counteracts premature wear of the cutting edge, even in the case of demanding conditions.

Comparable face geometries are disclosed in DE 42 39 236 A1. After a short, planar piece that is adjacent to the flank, the face initially slopes downwards to a lower level, via inclined or concavely curved surfaces, to rise up, in the direction of the center, to a face plateau. A hollow formed in this manner behind the cutting edge is intended to effect a favorable chip discharge and a reliable chip breakage. For the purpose of improving the chip guidance it is proposed in DE 42 39 236 A1 to realize raised chip-forming elements, which extend in the form of longitudinal ribs, substantially in the chip discharge direction, over the chip breaker hollow.

A further cutting insert having raised chip-forming elements in the form of longitudinal ribs is described by DE 44 37 093 A1, wherein the chip-forming elements are arranged substantially in the downwardly sloping region of the chip breaker hollow and are at a distance from the face plateau. This face geometry is intended, in chip-removing machining, to effect forming of the discharging chip directly in the region close to the cutting edge, without the cutting insert itself being greatly loaded by the discharging chip.

The object of the present invention is to further develop a cutting insert of the type described at the outset, in such a way that selective chip forming over the entire field of application is ensured.

This object is achieved by a cutting insert having the features as claimed in claim 1, wherein, according to the invention, a plurality of raised chip-forming elements are arranged parallel to one another, and at equal spacings, on two mutually opposite, upwardly sloping wall portions of the face plateau, which chip-forming elements have a top surface, which slopes downwards to the chip-forming base, and downwardly sloping flanks.

Actual embodiments of the invention are described in the dependent claims.

In the case of the rectangular cutting insert according to the invention, the face plateau and the chip-forming elements are arranged in mirror symmetry in relation to the respective cutting-edge mid-perpendiculars. The length and the width of the face plateau are matched to the respective field of application of the cutting insert. Preferably, the face plateau constitutes a rectangular central web having two respectively opposite short and two long sides. Further, the short sides are preferably at a shorter distance from the respective cutting edge than are the long sides, such that the chip-forming base in front of the longitudinal sides is of greater width. The raised chip-forming elements arranged in front of the face plateau project into the chip-forming base of greater width.

The face plateau is located at the cutting-edge height or above it, i.e. the face plateau can project over the plane in which the cutting edges are located. Preferably, the downwardly sloping top surfaces of the chip-forming elements that taper onto the lower-level chip-forming base begin below the plane of the face plateau, such that, depending on the height of the face plateau, they are located entirely or at least partially below the cutting edge plane.

The downwardly sloping top surfaces of the chip-forming elements constitute ramps that have a lesser inclination than and/or in partial regions the same inclination as the inclined wall portions of the face plateau in front of which they are arranged, the inclined wall portions of the face plateau being inclined at an angle of 20° to 40°, preferably at an angle of 30°, relative to the chip-forming base. The angle of inclination of the top surfaces of the chip-forming elements is preferably $\leq 15°$, at least in a partial region.

Provision is made, in a preferred embodiment, whereby the number of chip-forming elements is between 3 and 11 per side. The chip-forming elements can also be even in number.

Preferably, the downwardly sloping planar wall portions arranged at a distance from the cutting edges are also inclined at an angle of 20° to 40°, preferably at an angle of 30°, relative to the chip-forming base.

According to a preferred embodiment, the chip-forming base is 0.4 mm to 0.6 mm, preferably 0.5 mm, lower than the planar face portion arranged at a rake angle of 0° and having a width of 0.5 mm to 1.5 mm, and it runs parallel thereto. The raised chip-forming elements projecting into the chip-forming base extend maximally as far as the center of the chip-forming base surface. The embodiment wherein the chip-forming elements extend only over a quarter of the width of the chip-forming base surface has proved particularly advantageous. The width of the top surface of a chip-forming element is substantially constant over its entire length, and is 1.0 mm to 2.5 mm, preferably 1.65 mm. The greatest total width W of the chip-forming elements is between 1.5 mm and 4.5 mm. The spacing of the chip-forming elements in relation to one another is 0.75 to 1.5 times the width of the top surface, preferably 4.35 mm, i.e. 6.0 mm from the center of a top surface to the center of the adjacent top surface. However, the top-surface width can also diminish towards the top side of the face plateau, the diminution also being able to be effected discontinuously, such that an offset is formed. In a preferred embodiment, the distance between the short wall portion and the start of the first chip-forming element should be approximately 0.75 to 2 times the width of the chip-forming elements. Further, the height of the chip-forming elements from the chip base to the end of the chip-forming elements should be between 0.45 and 1.25 mm.

Preferably, all edges of the face, both outer and inner edges, are rounded, in order to render the edges more resistant to wear. Furthermore, a full-perimeter chamfer, arranged along the cutting edge, is proposed for the purpose of stabilizing the cutting edge. Preferably, the width of the chamfer in the face plane is 0.4 mm to 0.6 mm, preferably 0.5 mm, and is inclined at an angle of 10° to 20°, preferably 15°, relative to the face portion arranged at a rake angle of 0°. The chamfer thus likewise counteracts premature wear of the cutting insert.

The face profile, composed of horizontal and inclined surfaces, and the arrangement of the chip-forming elements according to the invention affect the chip discharge in that selective chip forming over the entire field of application is ensured.

An actual embodiment of the invention is represented in the following drawings, wherein.

Figure 1:
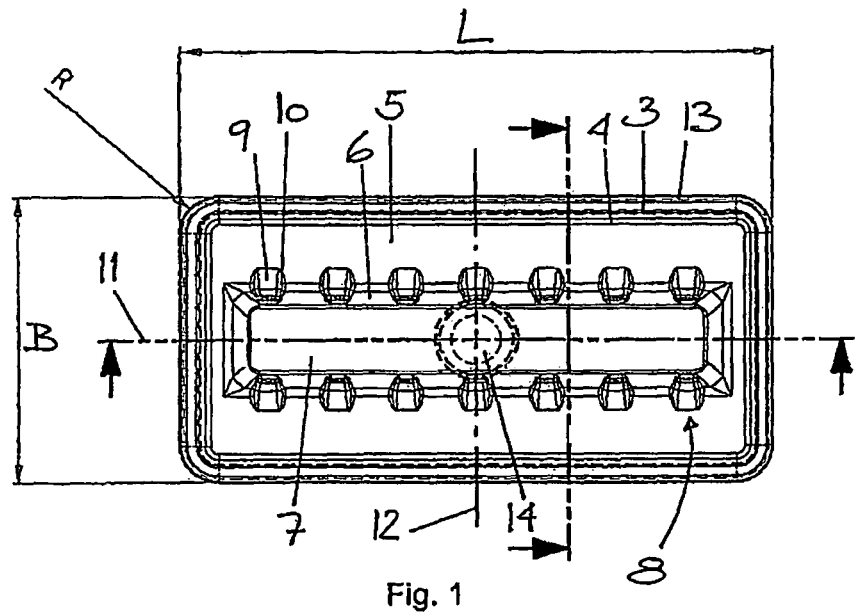
FIG. 1 shows a top view of a cutting insert according to the invention.
Figure 5:
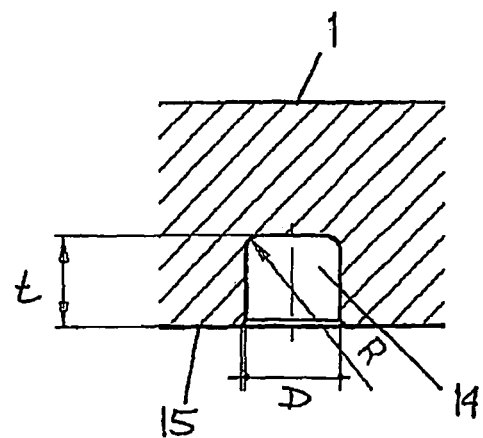
FIG. 5 shows a detail of a longitudinal section through the cutting insert according to FIG. 1.

The cutting insert represented in FIGS. 1 to 6 has a rectangular basic form, having two respectively opposite long and two short cutting edges, the corners of the cutting edges being rounded. The ratio of the long cutting edges to the short cutting edges is 2:1, the cutting insert having, overall, a length L of approximately 50 mm, a width B of approximately 25.5 mm and a total height H of approximately 14.5 mm. The dimensions of the cutting insert can vary, however, depending on the application conditions.

A full-perimeter chamfer 13 of constant width is arranged along the cutting edges, the width c of the chamfer 13 in the face plane being 0.5 mm. The angle of inclination γ, which denotes the inclination of the chamfer 13 relative to a planar face portion 3 arranged at a rake angle of 0°, is 15°.

The planar face portion 3 arranged at a rake angle of 0° adjoins the chamfer 13, and has a full-perimeter width d of 0.85 mm. From this portion, the face 1 slopes downwards, via appropriate wall portions 4, to a horizontal chip-forming base 5, to rise up, in the direction to the center, via likewise inclined wall portions 6, to a centrally located face plateau 7. The inclinations α, α' of the wall portions 4 and 6 in relation to the horizontal plane of the chip-forming base are 30° in each case.

The side edges of the face plateau 7 run parallel to the cutting edges of the cutting insert. The face plateau is additionally arranged symmetrically in relation to the respective cutting-edge mid-perpendiculars 11, 12. However, the distance of the face plateau 7 from the short cutting edges is less than from the long cutting edges of the cutting insert, such that there results a full-perimeter chip-forming base of differing width. The width b of the chip-forming base, i.e. the region over which the chip-forming base 5 extends between the wall portions 4 and 6, is 5.8 mm in front of the longitudinal sides of the face plateau and 1.8 mm in front of the transverse sides. Relative to the face portion 3 arranged at a rake angle of 0°, the chip-forming base 5 is lower by the dimension a=0.5 mm.

Arranged in front of the two long inclined wall portions 6 of the face plateau 7 are seven chip-forming elements 8 of equal width and equal length, having a center-to-center spacing of 6.0 mm in each case, which project into the chip-forming base 5. The arrangement of the chip-forming elements 8 in relation to the mid-perpendiculars 11, 12 is again symmetrical. There are no chip-forming elements 8 arranged in front of the short inclined wall portions 6 of the face plateau 7. As can be seen from FIGS. 3 and 4, each chip-forming element 8 has a top surface 9 that, relative to the chip-forming base 5, is inclined by 15° in the lower region and by 30° in the upper region, and inclined lateral flanks 10. The flanks 10 of the chip-forming elements 5 have a clearance angle of 10° to 30°, the edges to the top surface 9 and to the chip-forming base 5, as well as to the wall portion 6, having rounding of equal or differing magnitude. The rounding should be between 0.2 and 1.2 mm. Projected onto the surface of the chip-forming base 5, each top surface projects 1.7 mm into the chip-forming base 5.

The width of the top surface 9 of a chip-forming element 8 is 1.65 mm. In the region in which it adjoins the wall portion 6, the top surface 9 has a lesser width, in that the lateral flanks 10 are slightly drawn-in. The top surface 9 is also slightly drawn-in in this region, such that an offset is produced. The greatest width of the chip-forming elements can be up to 4.5 mm (depending on the top surface width).

FIG. 1 further shows a central, circular recess 14 in the mounting surface 15, i.e. the surface opposite the face 1. The recess 14 serves to receive a fastening device. The diameter D of the recess 14 is approximately 6.5 mm, the depth t being approximately 6 mm (cf. FIG. 4).

Additionally shown in FIG. 1 is the distance A, which is between the short wall portions and the first chip-forming element.

Figure 2:
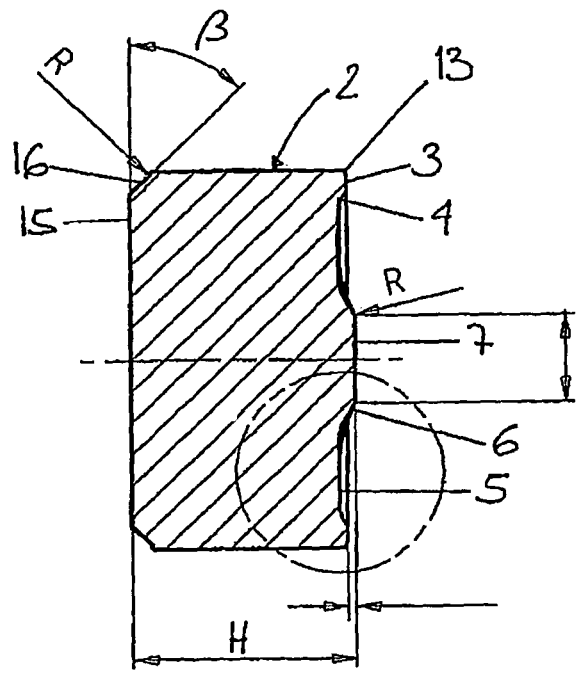
FIG. 2 shows a cross-section through the cutting insert according to FIG. 1, along the section line A-A.
Figure 3:
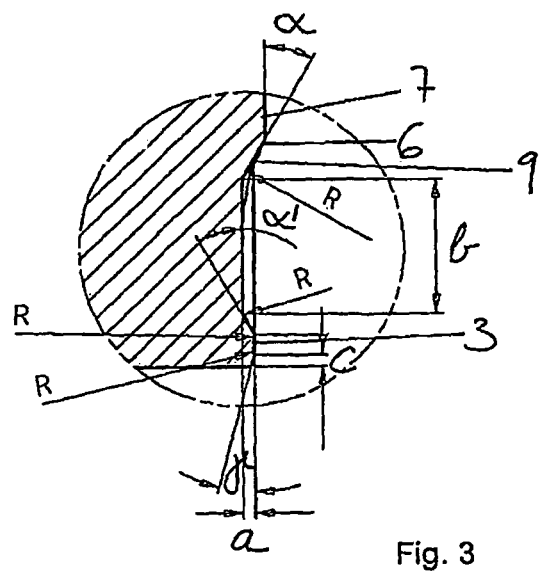
FIG. 3 shows a detail of the cross-section according to FIG. 2.
Figure 4:
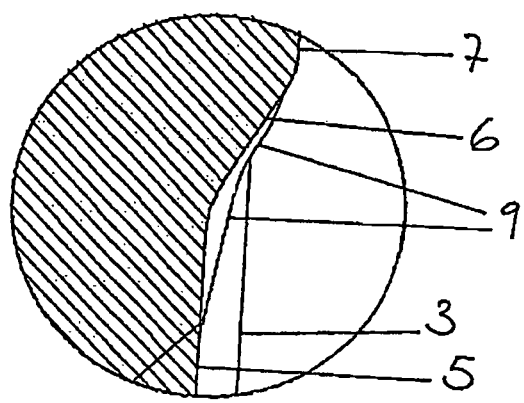
FIG. 4 shows a detail of the segment according to FIG. 3.

As can be seen from FIG. 2, the cutting insert has a full-perimeter bevel 16 on its back side, the angle of inclination β in relation to the mounting surface 15 being 45°.

Figure 6:
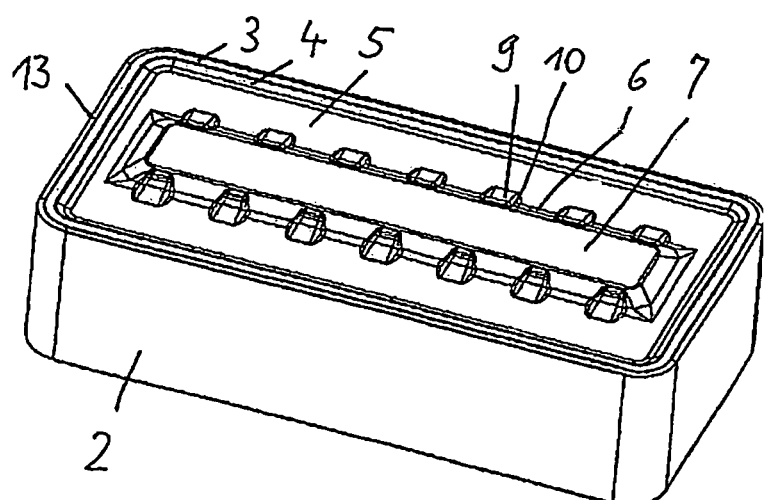
FIG. 6 shows an isometric representation of the cutting insert according to FIGS. 1 to 5.

The isometric representation in FIG. 6 shows clearly the profile of the face 1 that determines the chip discharge and chip forming. It ensures selective chip forming over the entire field of application of the cutting insert. The cutting edge geometry is determined substantially by the chamfer 13, the face portion 3 arranged at a rake angle of 0° and the wall portions 4 sloping downwards onto the chip-forming base 5, as well as by the raised chip-forming elements. It is distinguished by a high wear resistance, a property that is of particular importance precisely in the field of heavy-duty chip-removing machining.

The invention claimed is:

1. A cutting insert for chip-forming machining, of which at least the top surface, on one side, constitutes the face and the full-perimeter, planar side surfaces, which are located at right angles to one another, constitute the flanks, wherein, after a planar face portion that is adjacent to the flanks and is arranged at a rake angle of 0°, the face tapers, via downwardly sloping planar wall portions , into a lower-level, planar chip-forming base and, in the direction of the center, it slopes up, via upwardly sloping planar wall portions, to a centrally located, planar face plateau wherein a plurality of raised chip-forming elements are arranged parallel to one another, and at equal spacings, on two mutually opposite, upwardly sloping wall portions of the face plateau which chip-forming elements have a top surface, which slopes downward to the chip-forming base and downwardly sloping flanks.

2. The cutting insert as claimed in claim 1 wherein the face plateau and the chip-forming elements are arranged in mirror symmetry in relation to the respective cutting-edge mid-perpendiculars.

3. The cutting insert as claimed in claim 1 wherein the face plateau is located at the cutting-edge height or the face plateau projects over the plane in which the cutting edges are located.

4. The cutting insert as claimed in claim 1 wherein the top surfaces of the chip-forming elements begin below the plane of the face plateau.

5. The cutting insert as claimed in claim 1 wherein the top surfaces of the chip-forming elements constitute ramps that have a lesser inclination than 15°, or in partial regions the same inclination as, the downwardly sloping planar wall portions of the face plateau that are inclined at an angle of 20° to 40° relative to the chip-forming base.

6. The cutting insert as claimed in claim 1 wherein the downwardly sloping planar wall portions arranged at a distance from the cutting edges are inclined at an angle α' of 20° to 40°, relative to the chip-forming base.

7. The cutting insert as claimed in claim 1 wherein the chip-forming base is lower by a dimension of 0.4 mm to 0.6 mm, preferably 0.5 mm, than the planar face portion arranged at a rake angle of 0°.

8. The cutting insert as claimed in claim 1 wherein the chip-forming elements projecting into the chip-forming base extend maximally over half of the width b of the chip-forming base surface, the chip-forming elements extending over a quarter of the width b of the chip-forming base surface.

9. The cutting insert as claimed in claim 1 wherein the spacing of the chip-forming elements in relation to one another is 0.75 to 1.5 times the width of the top surface.

10. The cutting insert as claimed in claim 1 wherein arranged along the cutting edges there is a full-perimeter chamfer whose width c in the face plane is 0.4 mm to 0.6 mm and which is inclined by an angle γ of 10° to 20° relative to the face portion of the face arranged at a rake angle of 0°.

11. The cutting insert as claimed in claim 1 wherein the cutting insert has two longer cutting edges, and that the raised chip-forming elements are arranged exclusively parallel to the longer cutting edges.

* * * * *